United States Patent
Tsengas

(10) Patent No.: US 8,286,589 B1
(45) Date of Patent: Oct. 16, 2012

(54) COVERED BOWLS SUCH AS PET FOOD AND WATER BOWLS

(75) Inventor: Steven Tsengas, Fairport Harbor, OH (US)

(73) Assignee: OurPet's Company, Fairport Harbor, OH (US)

( * ) Notice: Subject to any disclaimer, the term of this patent is extended or adjusted under 35 U.S.C. 154(b) by 0 days.

(21) Appl. No.: 12/688,981

(22) Filed: Jan. 18, 2010

Related U.S. Application Data

(63) Continuation-in-part of application No. 12/049,962, filed on Mar. 17, 2008, which is a continuation-in-part of application No. 11/067,046, filed on Feb. 28, 2005, which is a continuation-in-part of application No. 10/616,282, filed on Jul. 10, 2003, now abandoned, which is a continuation-in-part of application No. 09/813,746, filed on Mar. 21, 2001, now abandoned.

(60) Provisional application No. 60/193,963, filed on Mar. 31, 2000.

(51) Int. Cl.
*A01K 5/00* (2006.01)
(52) U.S. Cl. .................................................. 119/61.56
(58) Field of Classification Search .............. 119/61.56, 119/61.54, 61.5
See application file for complete search history.

(56) References Cited

U.S. PATENT DOCUMENTS

| | | | | |
|---|---|---|---|---|
| 517,789 A | * | 4/1894 | Buckley | 215/386 |
| 1,891,077 A | * | 12/1932 | Beach | 215/394 |
| 1,922,127 A | * | 8/1933 | Foley | 220/632 |
| 1,959,262 A | * | 5/1934 | Colabrese | 220/632 |
| 1,985,558 A | * | 12/1934 | Alexander | 220/632 |
| 2,526,165 A | * | 10/1950 | Smith | 62/457.3 |
| 2,731,056 A | * | 1/1956 | Anson | 16/86 A |
| 3,229,949 A | * | 1/1966 | Chaconas | 248/346.11 |
| 3,374,298 A | * | 3/1968 | Studen | 264/41 |
| 3,698,594 A | * | 10/1972 | Boehlert | 220/495.01 |
| 4,803,954 A | * | 2/1989 | Welch et al. | 119/61.53 |
| 4,828,112 A | * | 5/1989 | Vollrath et al. | 206/519 |
| 4,978,022 A | * | 12/1990 | Weick | 220/521 |
| 5,000,123 A | * | 3/1991 | Morse et al. | 119/61.54 |
| 5,018,695 A | * | 5/1991 | Bishop | 248/346.11 |
| 5,372,274 A | * | 12/1994 | Freedland | 220/571 |
| 5,413,302 A | * | 5/1995 | Ferster | 248/346.11 |
| 5,485,937 A | * | 1/1996 | Tseng | 220/571 |

(Continued)

FOREIGN PATENT DOCUMENTS

WO WO 9205088 A1 * 4/1992

OTHER PUBLICATIONS

U.S. Appl. No. 11/067,046, Tsengas.

(Continued)

*Primary Examiner* — Yvonne Abbott
(74) *Attorney, Agent, or Firm* — John D. Gugliotta, PE, Esq

(57) ABSTRACT

A cover for a bowl, such as a pet food or water bowl, that comprises a dip molded cover on the outer surface of a bowl, thereby providing aesthetically pleasing exterior features, while also providing protection to the covered bowl and insulating qualities to the contents of the covered bowl. The cover of the present invention may be fabricated from rubber or plastic material and may be permanently or removeably secured to the outer surface of the bowl.

10 Claims, 4 Drawing Sheets

U.S. PATENT DOCUMENTS

| | | | | |
|---|---|---|---|---|
| 5,579,946 A | * | 12/1996 | Rowan et al. | 220/592.27 |
| 5,842,675 A | * | 12/1998 | Davitt | 248/346.5 |
| 5,957,038 A | * | 9/1999 | Shimazaki | 99/340 |
| 5,979,361 A | * | 11/1999 | Willinger | 119/61.54 |
| 5,992,671 A | * | 11/1999 | Wardani | 220/293 |
| D423,733 S | * | 4/2000 | Choi et al. | D30/129 |
| 6,092,689 A | * | 7/2000 | Bennett | 220/729 |
| 6,330,956 B1 | * | 12/2001 | Willinger | 220/574 |
| 6,431,389 B1 | * | 8/2002 | Jerstroem et al. | 220/574.3 |
| 6,516,747 B1 | * | 2/2003 | Willinger | 119/61.54 |
| 6,578,809 B1 | * | 6/2003 | Dimella | 248/346.11 |
| 6,672,248 B2 | * | 1/2004 | Bourigault | 119/63 |
| D539,094 S | * | 3/2007 | Wasserman et al. | D7/584 |
| D564,711 S | * | 3/2008 | Modi et al. | D30/129 |
| D565,253 S | * | 3/2008 | Modi et al. | D30/129 |
| 7,527,018 B2 | * | 5/2009 | Manley-Hood | 119/61.5 |
| D613,125 S | * | 4/2010 | Sierra et al. | D7/584 |
| D613,556 S | * | 4/2010 | Sierra et al. | D7/584 |

OTHER PUBLICATIONS

U.S. Appl. No. 10/616,282, Tsengas.
U.S. Appl. No. 09/813,746, Tsengas.

* cited by examiner

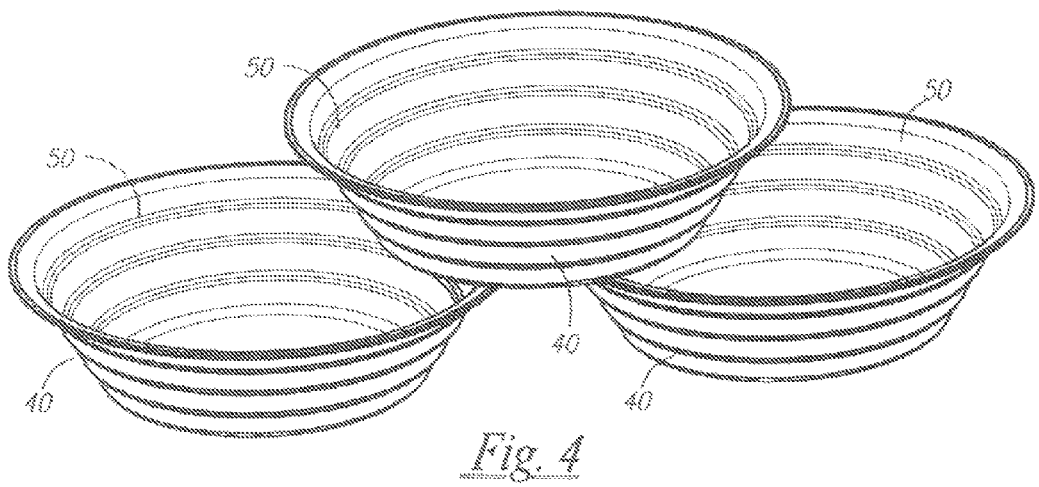
Fig. 4
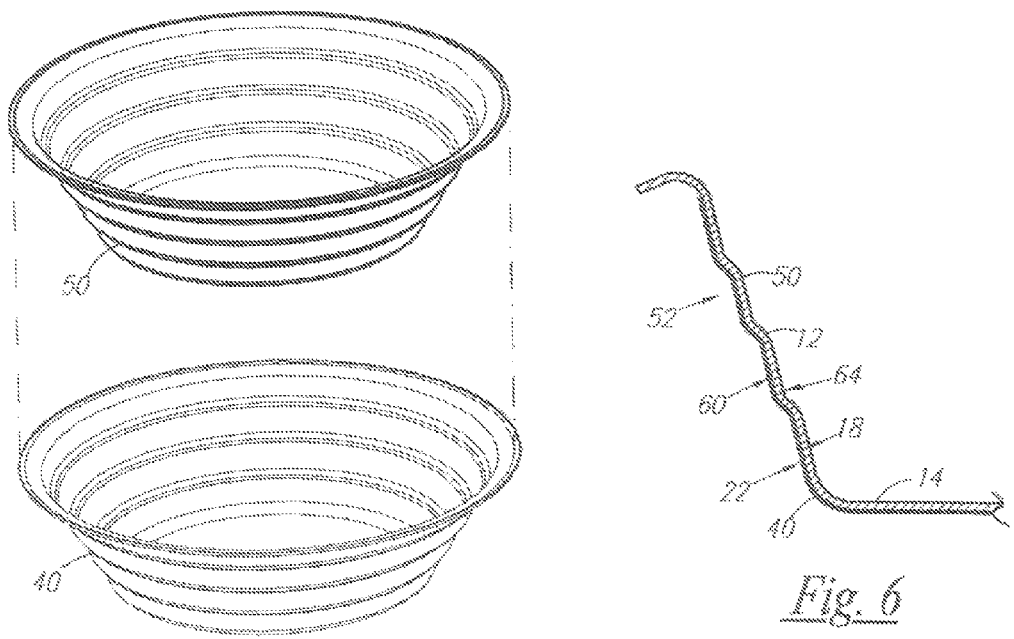
Fig. 5
Fig. 6

COVERED BOWLS SUCH AS PET FOOD AND WATER BOWLS

RELATED APPLICATIONS

The present application is a Continuation-in-Part of U.S. Non-Provisional patent application Ser. No. 12/049,962 Mar. 17, 2008, which was a Continuation-in-Part of U.S. Non-Provisional patent application Ser. No. 11/067,046, filed on Feb. 28, 2005, which is a Continuation-in-part of U.S. Ser. No. 10/616,282, filed on Jul. 10, 2003 now abandoned, which was a Continuation-in-Part of U.S. Ser. No. 09/813,746, filed on Mar. 21, 2001 now abandoned, which was a conversion of U.S. Provisional Application Ser. No. 60/193,963, filed on Mar. 31, 2000, wherein the present application claims a benefit of the priority filing date of Mar. 31, 2000.

BACKGROUND OF THE INVENTION

1. Field of the Invention

The present invention relates generally to new and novel improvements in pet food and water bowls. More particularly, the present invention relates to a covered pet food and/or water bowl, such as a stainless steel pet feeder having a cover that is preferably durable and lightweight, and provides an aesthetically pleasing appearance, protection to both the bowl and the surface on which the bowl may be set upon, and possibly some insulating properties to the contents placed therein.

2. Description of the Related Art

In the related art, a few covered bowls and covered container articles are disclosed. For example, U.S. Serial No. 2,731,056, issued in the name of Anson, discloses a unitary molded body that preferably is made of an elastic rubber-like material that can be a plasticol and has an endless series of pronounced pleats extending axially of the body. The body can serve as a coaster for a glass or for other containers having various sizes and shapes, including flower pots, milk bottles, and soda bottles, and can serve as a protective sleeve for various objects. However, such a device as described in Anson cannot be utilized as a pet food and water bowl.

Further, U.S. Pat. No. 5,979,361, issued in the name of Willinger, discloses a non-skid pet bowl comprising a bowl having molded over it a non-skid thermoplastic elastomer that covers the bowl's undersurface and desirably runs midway up the bowl's sidewall. The bowl is first molded from plastic, and then the thermoplastic elastomer is molded as a coating or layer over it. However, such a device cannot be used directly for stainless steel bowls, and does not anticipate a separate cover that is affixed to the stainless steel bowl via an inference fit.

Finally, U.S. Pat. No. 1,922,127, issued in the name of Foley, discloses a pail silencer made of a single piece of resilient material, such as rubber, and including a cup designed to receive and grip the lower end of the pail. Again, however, such a device cannot be utilized as a pet food and water bowl, cannot be used directly for stainless steel bowls, and does not anticipate a separate cover that is affixed to the stainless steel bowl via an inference fit.

Given the particular advantages of providing an anti-microbial growth surface environment when used with stainless steel that are particularly well suited for use in pet food and water bowls, and given the tremendous and immediate commercial success of applicant's DURAPET™ brand pet food and water bowls, it is felt that the improved covered bowl of the present invention provides these advantages while avoiding the shortcoming of the prior art.

SUMMARY OF THE INVENTION

It is therefore an object of the present invention to provide an improved covered pet bowl having an altered external appearance.

It is another object of the present invention to provide a covered for a pet bowl that minimizes and substantially precludes the bowl from slipping and sliding along or across a surface, such as a floor, upon which it is placed.

It is a further feature of the present invention to provide a covered pet bowl that can provide some level of insulation for the contents of the bowl placed therein.

Briefly described according to the preferred embodiment of the present invention, the aforementioned objects of the present invention are attained by a stainless steel pct bowl having a cover secured to the exterior surface of a bowl such as by molding or adhesive attachment. The cover may also be manufactured by various other known means for shaping plastic or rubber type materials. The cover may provide a pleasing aesthetic appearance, as well as providing protection to the bowl's bottom or the surface on which the bowl may be placed. In an alternate embodiment, the cover is not adhered or molded on, but rather has a slight to zero interference fit with the exterior surface of the bowl to normally remain on the exterior surface of the bowl when the bowl is lifted or otherwise moved. The cover's inner surface is then substantially formed to the shape of the bowl to fit over the outer surface of the bowl. In the preferred embodiment the covered bowl is formed as a single unit; in the alternate embodiment, the cover is removable from the bowl or can be provided separately. In either embodiment the cover may be fabricated from various materials such as rubber or plastic based material to provide resistance to substantially prevent the bowl from slipping, sliding or otherwise moving during use by the pet, and further preventing scratching, scarring and annoying noises that may result from sliding on a floor. Finally, if formed of sufficient thickness the cover can provide insulation to the contents placed within the bowl.

Other advantages and novel features of the present invention will become apparent in the following detailed description of the invention when considered in conjunction with the accompanying drawings.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a front perspective view of a covered bowl according to an alternate embodiment of the present invention;

FIG. 5 is an exploded front perspective view of the embodiment of FIG. 4;

FIG. 6 is a cross sectional view taken along line VI-VI of FIG. 5;

DESCRIPTION OF THE PREFERRED EMBODIMENTS

The best mode for carrying out the invention is presented in terms of its preferred embodiment, herein depicted within FIGS. 1 through 8.

1. Detailed Description of the Figures

Figure 1:
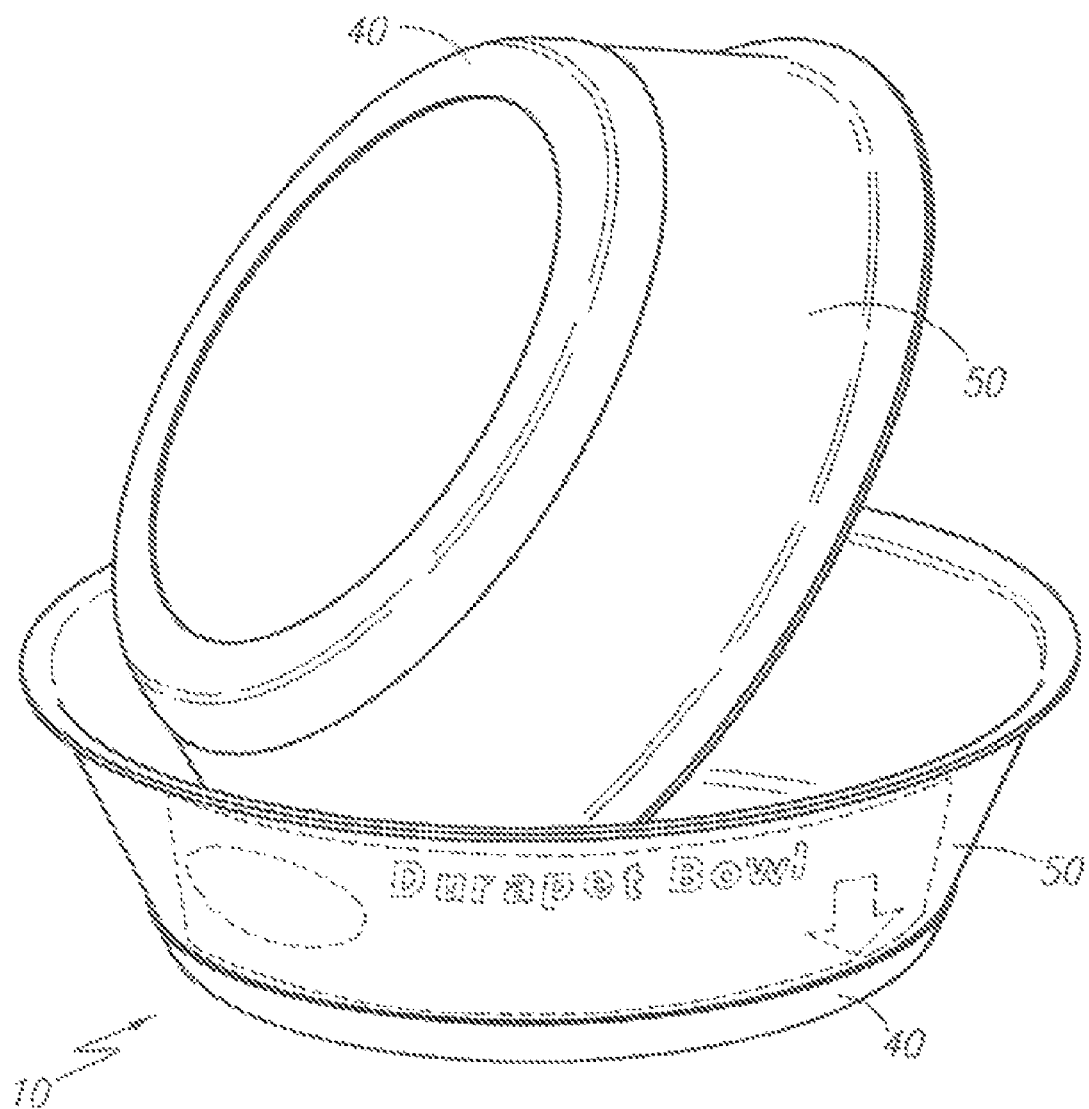
FIG. 1 is a front perspective view of a covered bowl according to the preferred embodiment of the present invention.
Figure 2:
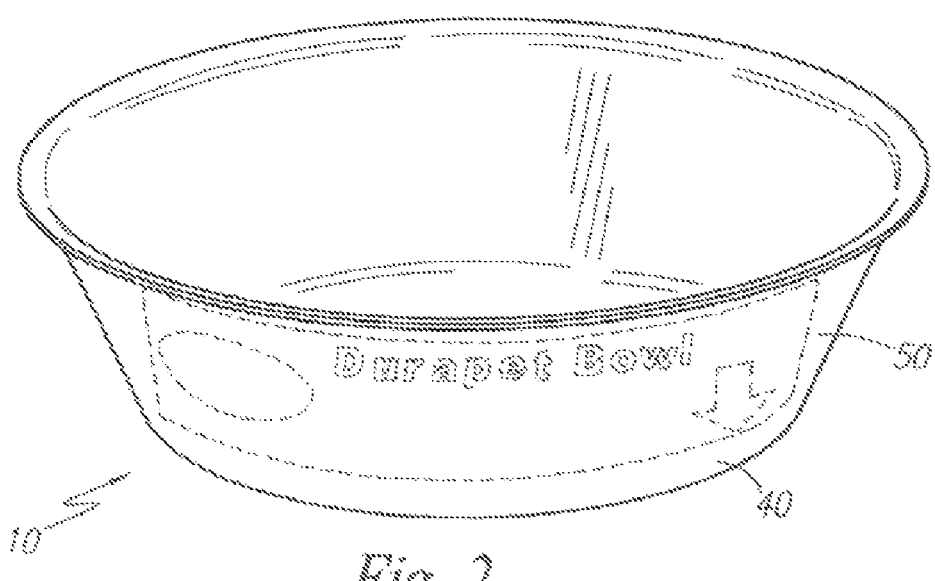
FIG. 2 is a rear, bottom perspective view thereof.
Figure 3:
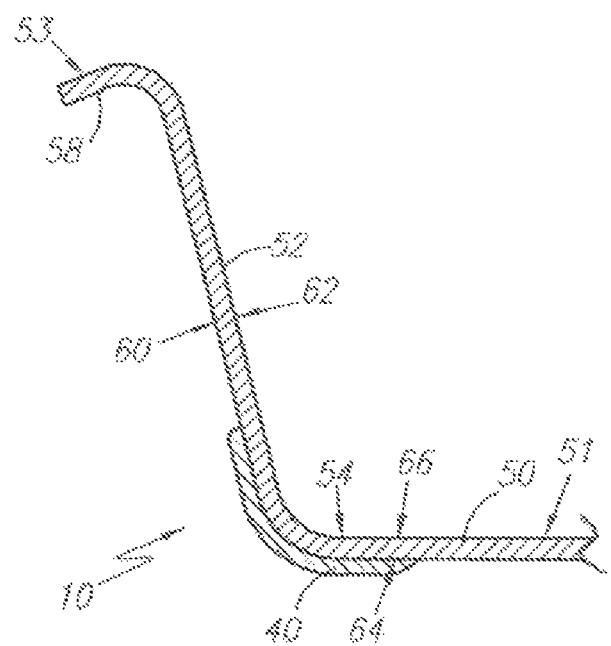
FIG. 3 is a cross sectional view thereof taken along line III-III of FIG. 1.
Figure 7:
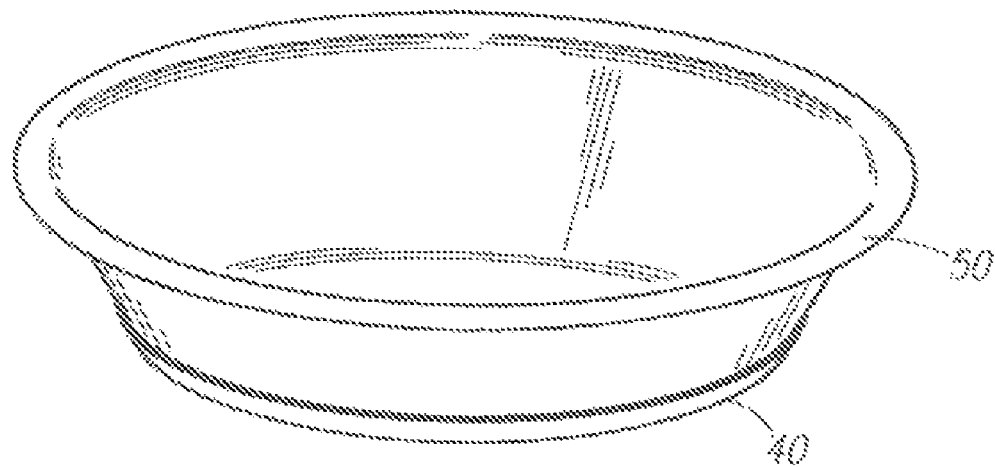
FIG. 7 is a front perspective view of a second alternate bowl design for use with the present invention.
Figure 8:
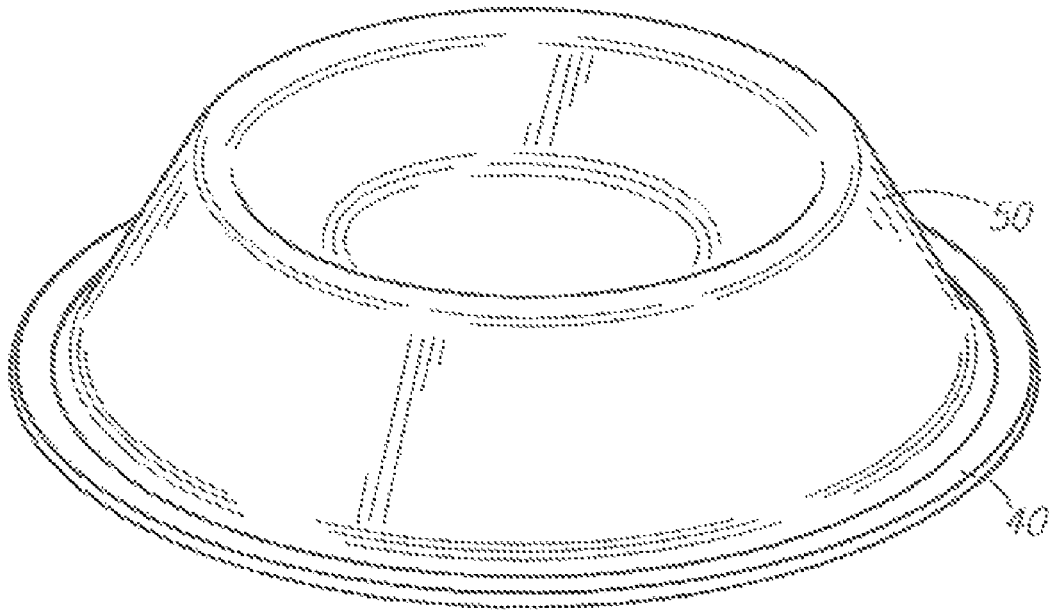
FIG. 8 is a front perspective view of a third alternate bowl design for use with the present invention.

Referring now to FIG. 1, a covered bowl 10 is shown in accordance with a preferred embodiment of the present invention. It is envisioned that the covered bowl 10 has an aesthetic outer cover 40 placed about the lower exterior of the bowl 50 and can be affixed thereto by a variety of methods, including molding or manual manipulation or adhesive attachment of a separately provided cover 40 onto the outer lower periphery of the bowl 50. Preferably, the cover 40 is attached about the exterior of the bowl 50 via a suitable adhesive or by directly molding the cover 40 onto the bowl 50, whereby the cover 40 remains affixed to the bowl 50 during lifting, moving or repositioning. As shown best in conjunction with FIG. 3, a permanent or semi-permanent adhesive 51 can be placed within the cover 40, onto the bowl 50, or both.

The bowl 50 may be of various designs, such as the one depicted in FIGS. 1-6, comprising an annular sidewall 52 depending from a bottom surface 54, wherein the sidewall 52 terminates at an upper peripheral rim 53 opposite the bottom surface 54 that is coextensive with a bowl opening 56. The sidewall 52 and bottom surface 54 each have an exterior surface, wherein the exterior and interior surfaces of the sidewall 52 are denoted as 60 and 62, respectively, and the exterior and interior surfaces of bottom surface 54 are denoted as 64 and 66, respectively. As shown in conjunction with FIGS. 7-8, other bowl designs can be adapted to use the present invention.

Referring now specifically to FIG. 4 through FIG. 6, an alternate embodiment is shown in which the cover 40 is a separable body comprising a continuous sidewall 12 depending from a base 14, the sidewall 12 being available in various heights and widths, and the base 14 also being available in various widths or thicknesses. The height of the sidewall 12 may vary between de minimis, wherein the sidewall 12 extends upward just beyond the junction of the sidewall 12 and base 14, to a maximum, wherein the sidewall 12 extends upward to cover the height of the sidewall 52 of bowl 50. It should be noted that FIG. 4 through FIG. 6 illustrate a cover 40 that substantially traverses the entire height of sidewall 52 of bowl 50, but traversal of sidewall 52 is not required or necessary. In this embodiment, frictional force and interference fit securely hold cover 40 on bowl 50, it is the circumferential contact between the exterior surfaces 60 and 64 of bowl 50 and the interior surfaces 18 and 22 of cover 40 that provides the frictional interference fit. Thus, the cover 40 only needs to extend upward as is necessary to secure the cover 40 to the bowl 50 by frictional interference fit.

2. Operation of the Preferred Embodiment

To use the present invention, in accordance with a preferred embodiment of the present invention, a cover 40 is placed upon a bowl 50 to provide protection to the bowl 50, reduce slipping and sliding of the bowl 50 during use by a pet, and provide insulating properties to the contents of the bowl 50. The cover 40 may be fabricated onto the bowl 50 during manufacture, or may be manually placed thereon. When a pet eats or drinks from the bowl 50, the cover 40 resists movement by the glutinous properties of the cover 40 adhering and frictionally impinging the cover 40 to a surface.

The foregoing descriptions of specific embodiments of the present invention have been presented for purposes of illustration and description and are not intended to be exhaustive or to limit the invention to the precise forms disclosed. Obviously many modifications and variations are possible in light of the above teaching. The embodiments were chosen and described in order to best explain the principles of the invention and its practical application, and enable others skilled in the art to best utilize the invention and various embodiments. It is intended that the scope of the invention be defined by the Claims appended hereto and their equivalents. Therefore, the scope of the invention is to be limited only by the following claims.

What is claimed is:

1. A single member animal feeder substantially comprising:
    a bowl formed of stainless steel or other metal;
    a cover placed about at least a portion of an exterior of said bowl in a continuous direct contact arrangement, said cover remaining affixed to said bowl during lifting, moving or repositioning; said cover resisting movements relative to a floor surface through adhering and frictionally impinging said cover to said floor surface; said cover having an annular sidewall extending up from a bottom exterior surface of said bowl, said sidewall surface terminating at an upper portion opposite said bottom outer surface that is coextensive with and circumscribes an outer surface of said bowl; said cover permanently attached to said bowl through frictional force and interference fit securely holding said cover on said bowl such that circumferential contact between the exterior surfaces of said bowl and the interior surfaces of said cover provides said frictional interference fit.

2. The animal feeder of claim 1, further comprising an adhesive placed between the exterior of the bowl and the interior of said cover.

3. The animal feeder of claim 2, wherein said cover is formed having a decorative color.

4. The animal feeder of claim 3, wherein said decorative cover is further formed of a material having insulating properties to provide insulation to the contents of the bowl and reduces the conduction of heat or cold from the bowl to the environment.

5. The animal feeder of claim 3, wherein said decorative cover is formed of a material capable of providing frictional resistance to the bowl so as to substantially reduce slipping and/or sliding along a floor or other surface upon which the bowl is placed.

6. The animal feeder of claim 1, wherein said cover forms an exterior surface with a plurality of ribs for providing:
    an exterior surface that is easily gripped by a user; and
    as an aesthetic feature to the exterior surface of said cover.

7. An animal feeder substantially comprising:
    a bowl formed of stainless steel or other metal, said bowl having an annular sidewall upwardly directed from a bowl bottom to form a holding volume;
    said bowl bottom having an upper surface bounding a lower portion of the holding volume and a lower surface opposite the upper surface; and
    a lower surface cover affixed to said lower surface, said lower surface cover is molded to said lower surface; said lower surface cover extends up from a bottom surface and up said at least a portion of said annular sidewall;

said lower surface cover circumscribes an outer edge of said lower surface of said bowl; said lower surface cover is formed of a material capable of providing said lower surface with an increased resistance to slipping and/or sliding along a floor or other surface upon which the animal feeder is placed; said lower surface cover is further formed of a material having insulating properties to provide insulation to the contents of the bowl and reduces the conduction of heat or cold from the bowl to the environment.

8. The animal feeder of claim 7 wherein said lower surface cover is formed having a decorative color.

9. The animal feeder of claim 7, wherein said lower surface cover further forms a textured exterior surface.

10. The animal feeder of claim 7, wherein said lower surface cover further forms a patterned exterior surface.

* * * * *